(12) United States Patent
Yen (10) Patent No.: US 12,468,561 B2
(45) Date of Patent: Nov. 11, 2025

(54) SYSTEM AND METHOD FOR AUTOMATICALLY ADJUSTING A USER INTERFACE BASED ON USER IDENTITY

(71) Applicant: BRICKS DISPLAY INC., Taipei (TW)

(72) Inventor: Hsiao-Yi Yen, Taipei (TW)

(73) Assignee: BRICKS DISPLAY INC., Taipei (TW)

( * ) Notice: Subject to any disclaimer, the term of this patent is extended or adjusted under 35 U.S.C. 154(b) by 183 days.

(21) Appl. No.: 18/523,290

(22) Filed: Nov. 29, 2023

(65) Prior Publication Data

US 2025/0173167 A1 May 29, 2025

(51) Int. Cl.
| | |
|---|---|
| G06F 3/048 | (2013.01) |
| G06F 3/01 | (2006.01) |
| G06F 3/0481 | (2022.01) |
| G06F 9/451 | (2018.01) |
| G06V 40/16 | (2022.01) |
| G06V 40/18 | (2022.01) |

(52) U.S. Cl.
CPC ............. *G06F 9/451* (2018.02); *G06F 3/013* (2013.01); *G06F 3/0481* (2013.01); *G06V 40/178* (2022.01); *G06V 40/18* (2022.01)

(58) Field of Classification Search
None
See application file for complete search history.

(56) References Cited

U.S. PATENT DOCUMENTS

| | | | |
|---|---|---|---|
| 10,419,744 B2* | 9/2019 | Doherty | H04N 13/332 |
| 2011/0099476 A1* | 4/2011 | Snook | G06F 3/011 |
| | | | 715/728 |
| 2022/0242433 A1* | 8/2022 | Hecht | G06V 20/59 |
| 2023/0014995 A1* | 1/2023 | Sharma | H04N 21/4415 |
| 2023/0244309 A1* | 8/2023 | Ahn | G06V 10/82 |
| | | | 345/156 |

* cited by examiner

*Primary Examiner* — Thanh T Vu
(74) *Attorney, Agent, or Firm* — RABIN & BERDO, P.C.

(57) ABSTRACT

The present invention provides a system and method for automatically adjusting a user interface based on user identity, aiming to offer a more personalized and user-centric interface experience. The system, installed on a server and at least one output device, operates in conjunction with a user device to enable automatic adjustment of the user interface. It dynamically adjusts the display interface based on user physical characteristics (such as height, vision, age, and eye-gazing position) and usage state. This includes modifications to display content, layout of display blocks, and interface presentation parameters to optimize user experience. Further, the system can auto-adjust font size and brightness based on user's height, vision, age, and eye-gazing location, ensuring optimal visibility and convenience. Particularly suitable for diverse usage environments and different user groups, this technology significantly enhances the flexibility of the interface and efficiency of user interaction.

10 Claims, 7 Drawing Sheets

SYSTEM AND METHOD FOR AUTOMATICALLY ADJUSTING A USER INTERFACE BASED ON USER IDENTITY

TECHNICAL FIELD

The present invention relates to the field of operating system interface adjustment technology, more specifically, to a system and method for automatically adjusting a user interface based on the results of user identity recognition; moreover, this aims to enhance the user experience by tailoring the interface content to suit the identified user, thereby improving user engagement and interaction.

BACKGROUND OF THE INVENTION

With the widespread adoption of communication technologies and the internet, there has been a significant shift in the way information is disseminated by the media. The focus has moved from traditional text and static images to electronic media dominated by images and audiovisual content. This shift represents a trend from one-way communication to more interactive and dynamic content. However, a major limitation of these media is that they often broadcast pre-made content, lacking the capability to respond in real time to receiver feedback.

Electronic devices with display units have further expanded the scope of media applications. In addition to information dissemination, these devices integrate specific functional blocks, such as ticket purchasing and shopping applications, enriching user interaction with the devices. Despite this, the design and deployment of these functional blocks still rely on backend pre-processing, lacking flexibility and personalization.

In current technology, designing and editing these broadcasted information requires programming operations, which is a significant barrier for non-technical professionals (e.g., advertising designers). They usually need to collaborate with software engineers to realize the desired designs, increasing the complexity of the work and limiting the flexibility and innovation in design.

In the field of Graphical User Interfaces (GUI), traditional technology primarily focuses on the visual and functional design of interfaces, but these designs are mostly static and generic. They fail to fully consider the personalized needs and operating habits of users, thus limiting the adaptability and user experience of the interface.

Further observation and analysis in the public service sector, particularly in the use scenarios of human-machine interaction machines in locations such as government buildings, transportation centers, tourist centers, and department stores, reveal that traditional GUI technology faces severe challenges. These devices are typically designed to provide information inquiry and other basic services but often fail to meet visitor needs effectively due to operational difficulties. A common situation is visitors spending a long time at the machine and still unable to find the required information, eventually resorting to manual assistance. This not only reduces the effectiveness of the devices but also increases the workload of public service personnel, as they need to spend time solving problems that the devices cannot address. Furthermore, this situation can lead to congestion and chaos in public places, especially during peak hours or at locations with high visitor traffic.

The user group of public services is extremely diverse, encompassing people of different ages, cultural backgrounds, and levels of technological proficiency. For example, older adults may prefer a simple, intuitive interface with larger text and clear color contrast for easier reading. In contrast, teenagers and children might be more familiar with complex multimedia elements and digital operations. However, traditional GUI designs often fail to meet the specific needs of these different groups. They usually adopt a one-size-fits-all design, unable to adapt to the characteristics and preferences of different users. This lack of flexibility not only makes it difficult for some users but also fails to provide a comprehensive service experience that meets everyone's needs.

Traditional graphical interfaces often focus on visual appeal and functionality but tend to overlook the diversity and depth of user experience. These interfaces are usually static, lacking the ability to adapt to user behavior and preferences. For example, for older adults with poor vision, standard text size may be too small, and insufficient color contrast can make reading and understanding information difficult. For visitors unfamiliar with digital technology, complex menu structures and technical jargon can cause confusion. Additionally, these devices often lack sufficient interactivity and flexibility to provide real-time feedback or assistance based on specific user actions, further increasing the difficulty of use.

In the design of public service equipment, a good user experience is crucial. If these devices cannot provide an interface that is easy to understand and operate for a broad range of users, their practical utility will be greatly reduced. Good design should quickly guide users to the information they need, making the operation process as intuitive and stress-free as possible. When users struggle to use these devices, they may feel frustrated and dissatisfied, which not only affects their overall impression of public services but also may lead to their aversion to using these technologies.

Facing these challenges, future GUI design needs to focus on user diversity and personalized needs. The ideal design should be able to recognize different user characteristics, such as age, vision condition, familiarity with technology, etc., and adjust the interface automatically based on these characteristics. For instance, when the system detects an older adult using it, it can automatically increase text size and color contrast and simplify operation steps to make the interface more user-friendly and easy to use for that user. For younger users, the system can provide richer multimedia content and interactive features to attract their attention and improve efficiency. Such design not only enhances the usability of the devices but also improves the overall quality of public services.

Therefore, based on the aforementioned analysis, it can be summarized that human- machine interaction machines and their internal interfaces placed in public domains still have the following shortcomings:

Traditional GUI design applied in public service machines faces operational difficulties, leading to poor utility.

The visitor group is diverse, with users of different ages and technical proficiency having varying operational needs.

Static and generic interface designs fail to adapt to the specific needs of different users, affecting the user experience.

Poor user experience can lead to reduced efficiency and dissatisfaction in public services.

Future designs need to focus on user diversity and provide personalized interface adjustment features.

In response to these limitations, this technology proposes a new type of graphical interface that combines user biometric identification and behavior analysis. This interface not only considers static user information, such as identity characteristics, but more importantly, dynamically captures and analyzes multidimensional information from the user, such as behavior, input messages, operation sequence, voice, and image. This comprehensive analysis enables the system to accurately identify user habits and preferences, thereby achieving dynamic adjustment and personalization of the interface, including adjustments to the application interface, graphics, operation flow, text size, layout, button placement, and display weight. This not only improves user experience but also reduces operational difficulty and provides higher personalization and interactivity for media broadcasting.

In summary, this technology offers a revolutionary approach to addressing the limitations in traditional media broadcasting and graphical interface design. It brings personalization and intelligence into interface design, making the dissemination of media content and functional blocks more aligned with the actual needs of users, thereby significantly enhancing the overall user experience and operational convenience.

SUMMARY OF THE INVENTION

This patent provides a system and method for automatically adjusting a user interface based on user identity, with the primary objective of offering a more personalized and user-centric interface experience. The system, installed on a server and at least one output device, achieves automatic adjustment of the user interface through communication linkage with a client device. The system dynamically adjusts the display interface based on user physiognomic characteristics (such as height, vision, age, and eye-gazing position) and usage state. This includes modifications to display content, layout of display blocks, and interface presentation parameters to optimize user experience. Further, the system can auto-adjust font size and brightness based on user's height, vision, age, and eye-gazing location, ensuring optimal visibility and convenience. Particularly suitable for diverse usage environments and different user groups, this technology significantly enhances the flexibility of the interface and efficiency of user interaction.

To achieve the primary objective of this invention, the inventors provide a system for automatically adjusting a user interface based on user identity, installed on a server and at least one output device. The server is communicatively linked to the output device and a client device. The system comprises an interface adjustment module installed on the server with multiple interface adjustment units, each corresponding to an interface display block that can replace the display content based on multiple sets of interface display configuration files. The interface display block corresponds to a portion of the display content of the client device of the output device. A processing module, installed on the server and electrically connected to the interface adjustment module; a memory module, installed on the server and electrically connected to the processing module, where the interface display configuration files are stored. A user physiognomy identification module, installed on the server and communicatively connected to a user characteristics capture module of the client device, transmits the captured user characteristics to the user physiognomy identification module. A user usage state recording module, installed on the server and communicatively connected to the output device, records the user's usage state and operation information. An interface presentation module, installed on the server and connected to the processing module, retrieves the interface display configuration files from the memory module through the processing module to change a presentation parameter of the interface presentation module. The interface presentation module is communicatively connected to the output device and controls the display interface content; and at least one display module, installed on the client device of the output device and signal-connected to the interface presentation module, includes a display unit and a computing unit. The display unit receives and displays media information generated by the interface adjustment module and the interface presentation module on the output device, and the computing unit recognizes and selectively makes triggerable changes to the media information. The user physiognomy identification module captures user information characteristics to produce a user feature category parameter and provides it to the processing module. The interface adjustment module generates a user corresponding interface adjustment parameter based on the user feature category parameter, and the processing module retrieves the corresponding interface display configuration file from the memory module and displays the adjusted display interface through the interface presentation module on the display module.

Preferably, the system further includes a user usage state feedback module installed on the server for receiving and processing user feedback information from the output device. The user usage state feedback module includes a user interaction interface that allows users to directly provide feedback on interface adjustments and system operations, and sends this feedback information back to the server.

Preferably, the user usage state feedback module further includes a data collection unit for collecting behavioral data of the user while operating the system, including operation frequency, preference settings, and operational issues. The collected data is sent back to the server to optimize the functionality and performance of the interface adjustment module and other related modules.

Preferably, each interface adjustment unit includes at least one script or program for handling user interactions to dynamically adjust the interface based on specific user needs. The user physiognomy identification module further includes a biometric identification unit for identifying user physiognomy based on biometric characteristics such as fingerprints, facial recognition, or voice patterns.

Preferably, the processing module includes a central processing unit (CPU) and at least one graphics processing unit (GPU) for enhancing the processing speed and efficiency of the interface adjustment module and the interface presentation module. The memory module further includes a fast access memory for storing frequently accessed interface display configuration files to accelerate data retrieval and processing.

Preferably, the user usage state recording module further includes a data analysis unit for analyzing user operation patterns and habits to optimize interface adjustment strategies. The interface presentation module further includes a dynamic link library (DLL) for supporting various types of media formats and interaction protocols, ensuring compatibility with multiple types of output devices.

Preferably, the interface adjustment module further includes an automatic rotation control unit and a display content arrangement unit. The automatic rotation control unit is responsible for adjusting the display orientation of the output device based on user height information obtained from the user physiognomy identification module. Additionally, the display content arrangement unit adjusts the display interface content of the output device based on user height information, increasing information density in the lower display blocks for shorter users while reducing and enlarging the information density and icons in the upper display blocks for taller users.

Preferably, the user characteristics capture module further includes a high-precision eye image capture unit signal-connected to an eye image analysis unit of the user physiognomy identification module. The eye image analysis unit analyzes user vision information based on eye image capture information from the high-precision eye image capture unit. When identifying myopia and hyperopia characteristics in users, adjustments to the screen display of the output device include display brightness, font size, and icon proportions.

Preferably, the user characteristics capture module further includes an eye tracking positioning unit for tracking and detecting user eye gaze positions on the screen. When the eye tracking positioning unit analyzes user gaze position, interface magnification adjustments are made to the area of the output device where the user is looking, with pop-up explanations for relevant icon options in that area.

Preferably, the user physiognomy identification module further includes a user age analysis unit for analyzing user age through image analysis. When the user age analysis unit determines the user's age, the interface adjustment module makes parameter adjustments to the display interface of the output device: for users detected to be over 65 years old, the number of icons and options displayed is reduced and enlarged for better visibility.

Additionally, this invention provides a method for automatically adjusting a user interface based on user identity recognition, comprising the following steps: (S1) Operating an interface adjustment module on a server, having multiple interface adjustment units, each corresponding to an interface display block; (S2) Using a processing module to retrieve interface display configuration files stored in a memory module; identifying user physiognomy based on user characteristics obtained from a user characteristics capture module of a client device through a user physiognomy identification module; (S3) Replacing the display content of the interface display block through the processing module based on the identified user physiognomy to adjust the display content of the client device; (S4) Recording and analyzing the user's usage state and operation information on an output device through a user usage state recording module; and (S5) Controlling the display interface content of the output device through an interface presentation module.

Preferably, a step (S1-1) is further included after step (S1), which involves analyzing the current operating environment or application status of the client device through the interface adjustment module to select the most suitable configuration of the interface display blocks.

Preferably, a step (S3-1) is further included after step (S3), which involves presenting a temporary user feedback interface after interface adjustment, allowing users to evaluate and provide feedback on the new interface display block.

Preferably, a step (S4-1) is further included after step (S4), which involves dynamically adjusting the subsequent user interaction process based on the user's operation information and usage state to optimize the user experience.

Preferably, a step (S5-1) is further included after step (S5), which involves automatically generating a user usage report based on the results of controlling the display interface content of the output device and storing the report in a memory module for future reference.

BRIEF DESCRIPTION OF THE DRAWINGS

The technical characteristics of this disclosure will become apparent with the detailed description of preferred embodiments accompanied with the illustration of related drawings.

DETAILED DESCRIPTION OF THE DISCLOSURE

In order to provide a clearer description of the system for automatically adjusting a user interface based on user identity recognition proposed by this invention, the following will detail a preferred embodiment in conjunction with the figures.

Figure 1:
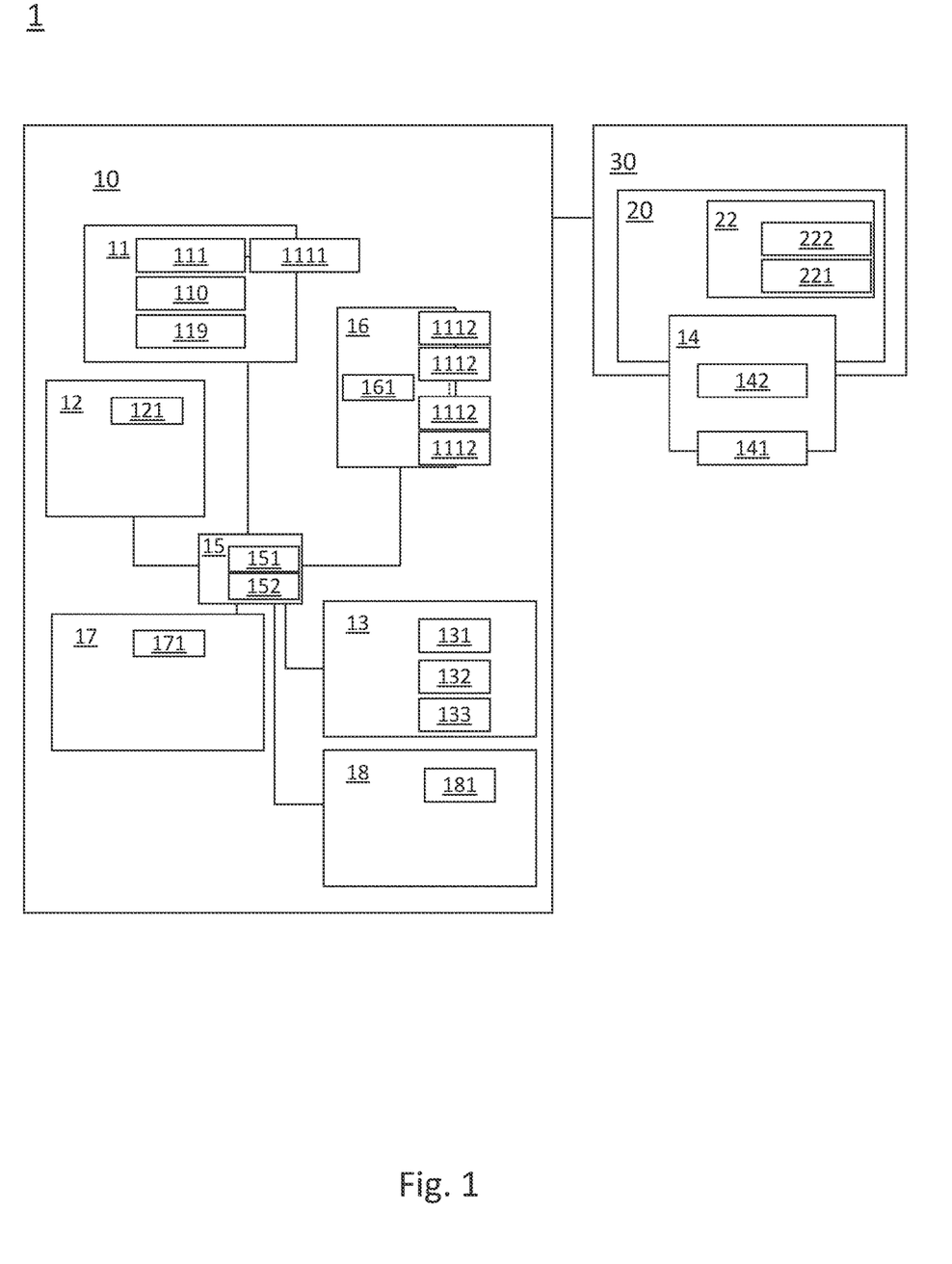
FIG. 1 shows a system block diagram of the invention for the system of invention.
Figure 2:
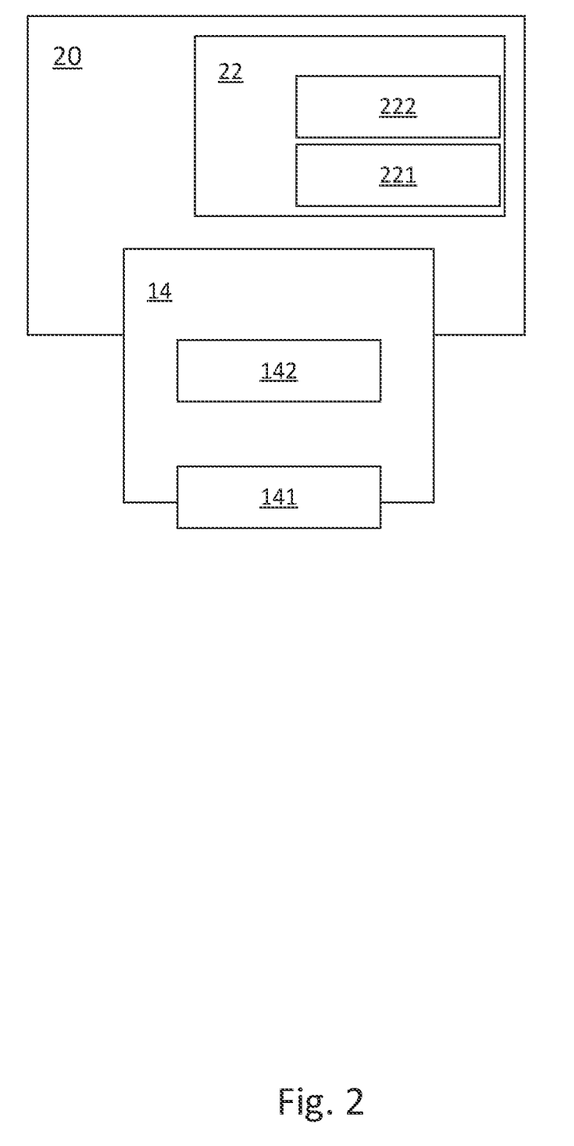
FIG. 2 shows another system block diagram of the invention for the system of invention.
Figure 3:
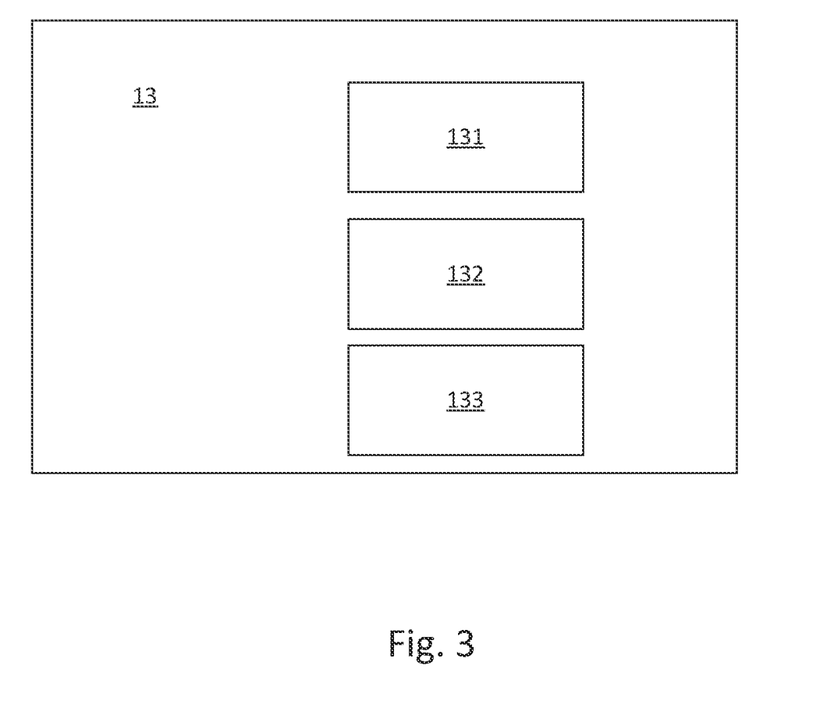
FIG. 3 shows yet another system block diagram of the invention for the system of invention.
Figure 4:
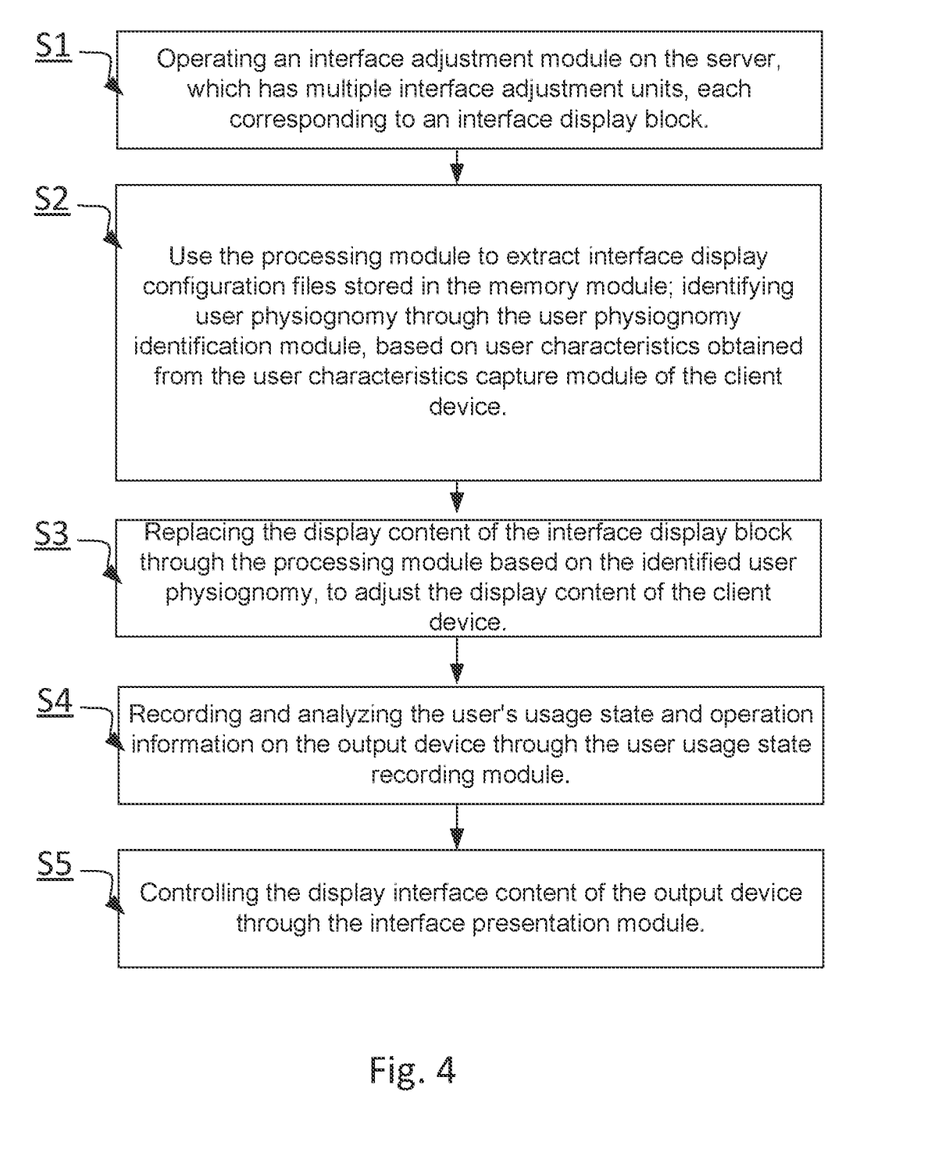
FIG. 4 shows a flowchart of the method for automatically adjusting a user interface based on user identity recognition, as described in the invention.
Figure 5:
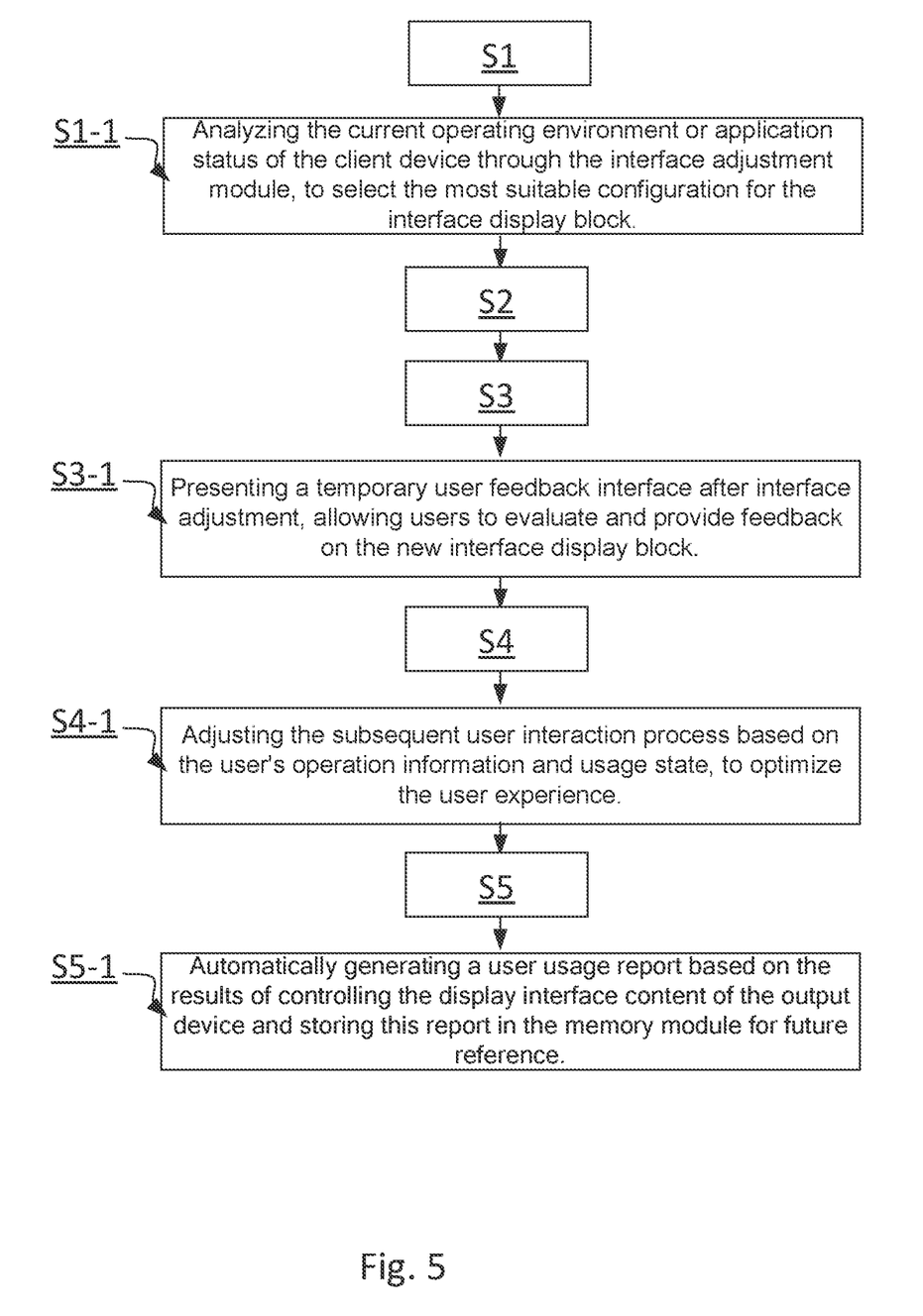
FIG. 5 shows another flowchart of the method for automatically adjusting a user interface based on user identity recognition, as described in the invention.
Figure 6:
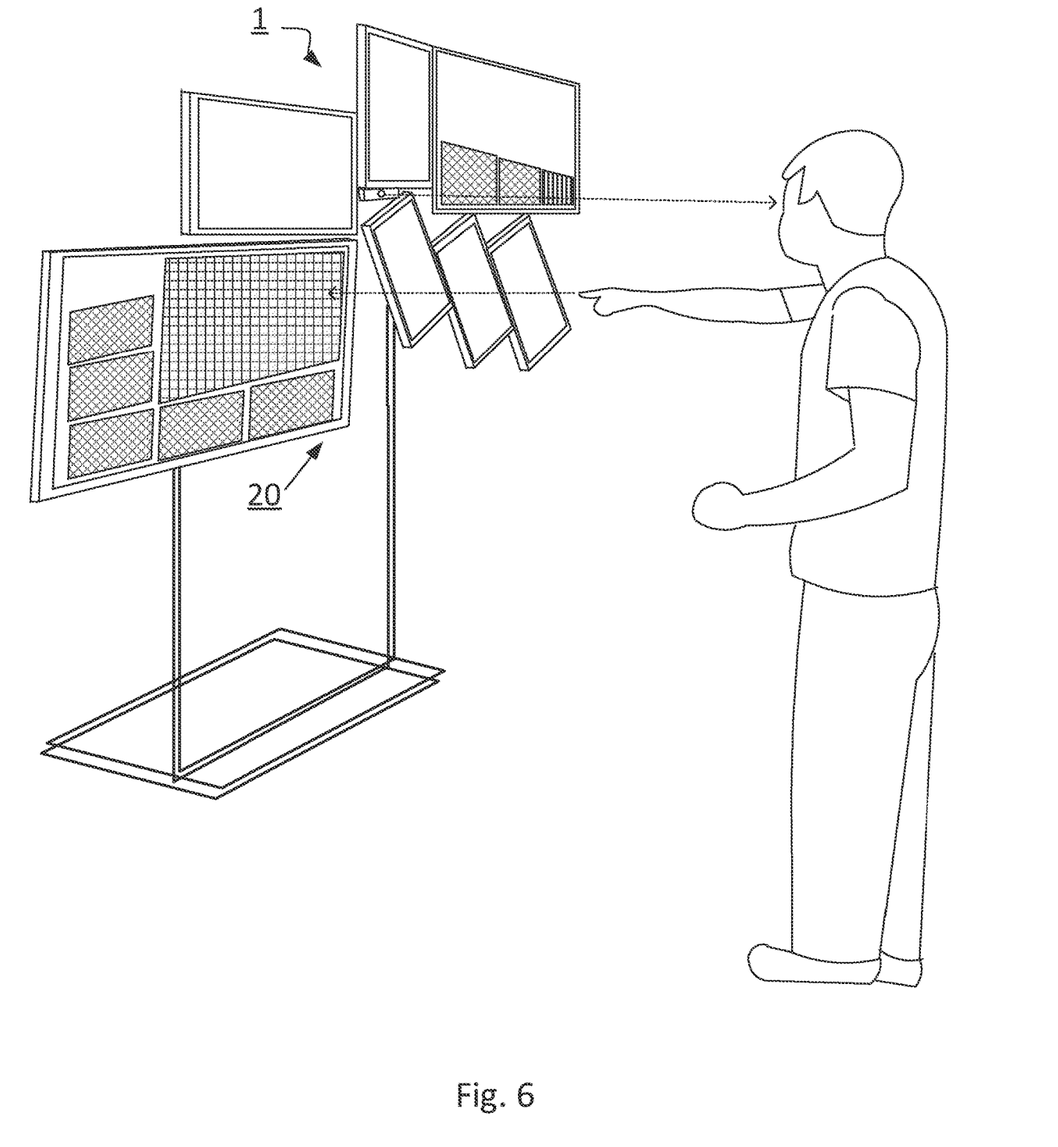
FIG. 6 shows a first operational schematic of the system for automatically adjusting a user interface based on user identity recognition, as described in the invention.
Figure 7:
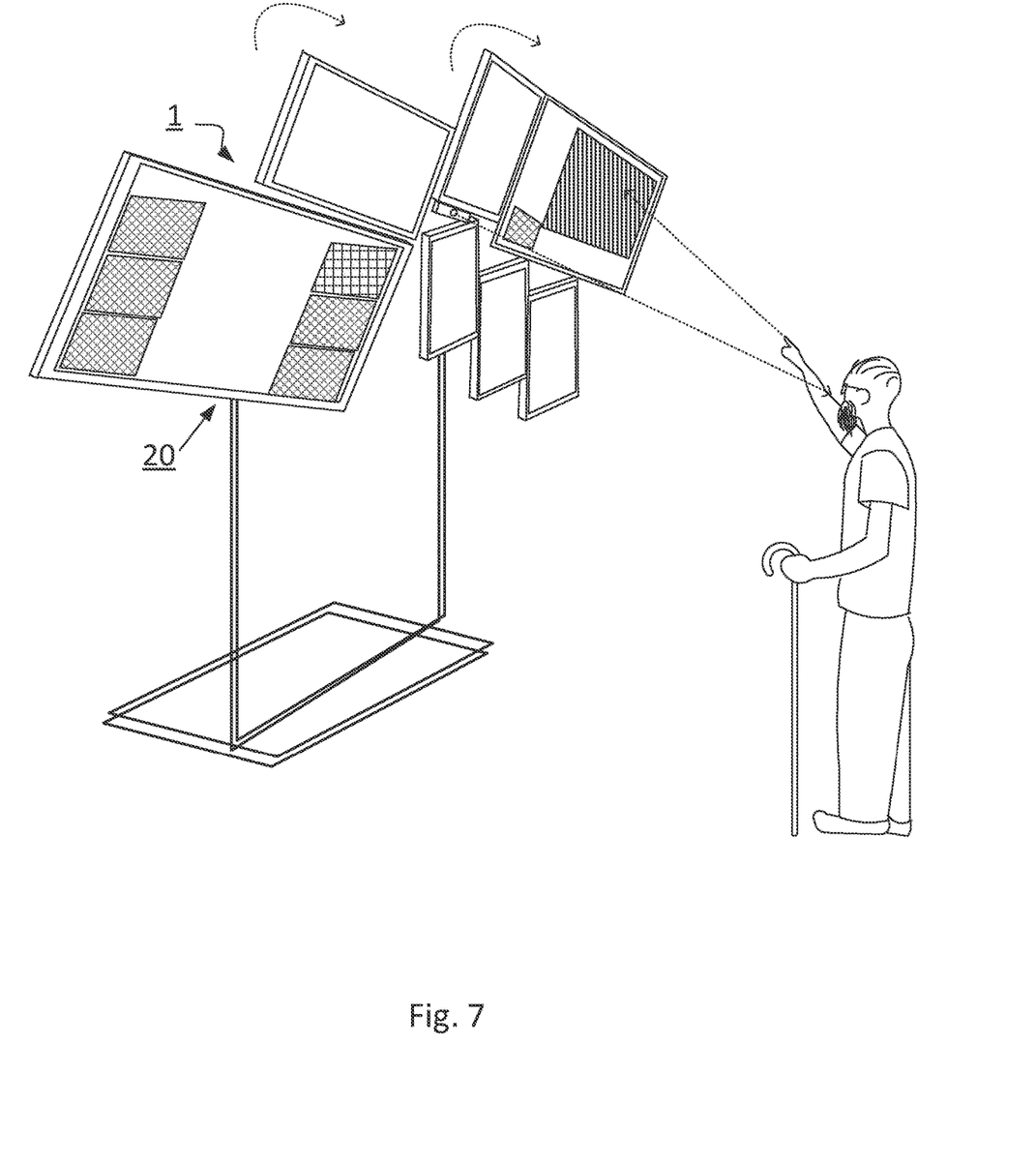
FIG. 7 shows a second operational schematic of the system for automatically adjusting a user interface based on user identity recognition, as described in the invention.

Please refer to FIG. 1, FIG. 2, FIG. 3, FIG. 4, FIG. 5, FIG. 6 and FIG. 7, wherein FIG. 1 shows a system block diagram of the invention for the system of invention; FIG. 2 shows another system block diagram of the invention for the system of invention; FIG. 3 shows yet another system block diagram of the invention for the system of invention; FIG. 4 shows a flowchart of the method for automatically adjusting a user interface based on user identity recognition, as described in the invention; FIG. 5 shows another flowchart of the method for automatically adjusting a user interface based on user identity recognition, as described in the invention; FIG. 6 shows a first operational schematic of the system for automatically adjusting a user interface based on user identity recognition, as described in the invention; and FIG. 7 shows a second operational schematic of the system for automatically adjusting a user interface based on user identity recognition, as described in the invention. As shown in figures, the present invention provides a system for automatically adjusting a user interface based on user identity 1 recognition is installed on a server 10 and at least one output device 30. The server is communicatively connected to the output device 30 and a client device 20. The system for automatically adjusting a user interface based on user identity recognition 1 comprises: an interface adjustment module 11, a processing module 15, a memory module 16, a user physiognomy identification module 13, a user usage state recording module 17, an interface presentation module 12, a display module 14, and a user feature category parameter provided to the processing module 15.

The interface adjustment module 11 is installed on the server 10 and has multiple interface adjustment units 111, where each interface adjustment unit 111 corresponds to an interface display block 1111. Based on multiple sets of interface display configuration files 1112, each unit can replace the display content of the interface display block 1111. The interface display block 1111 corresponds to a part of the display content of the client device of the output device.

Additionally, the processing module 15 is installed on the server 10 and is electrically connected to the interface adjustment module 11. The memory module 16, installed on the server 10 and electrically connected to the processing module 15, stores the multiple sets of interface display configuration files 1112. These files can be retrieved by the interface adjustment module 11 through the processing module 15. Furthermore, the user physiognomy identification module 13 is installed on the server 10 and is communicatively connected to a user characteristics capture module 22 of the client device 20. The user characteristics capture module 22 transmits the captured user characteristics to the user physiognomy identification module 13.

Further, the user usage state recording module 17 is installed on the server 10 and is communicatively connected to the output device. It records the user's usage state and operation information through the output device. The interface presentation module 12 is installed on the server 10 and connected to the processing module 15. The interface adjustment module 11 retrieves the interface display configuration files 1112 from the memory module 16 through the processing module 15, thereby changing a presentation parameter of the interface presentation module 12. The interface presentation module 12 is communicatively connected to the output device and controls the display interface content of the output device through the presentation parameter.

Furthermore, the display module 14 is installed on the client device 20 of the output device 30 and is signal-connected to the interface presentation module 12. The display module 14 includes a display unit 141 and a computing unit 142. The display unit 141 receives and displays media information generated by the interface adjustment module 11 and the interface presentation module 12 on the output device. The computing unit 142 recognizes and selectively makes triggerable changes to the media information.

In this invention, the user physiognomy identification module 13 captures user information characteristics to produce a user feature category parameter and provides it to the processing module 15. The interface adjustment module 11 generates a user corresponding interface adjustment parameter based on the user feature category parameter. The processing module 15 retrieves the corresponding interface display configuration file 1112 from the memory module 16 based on the user corresponding interface adjustment parameter and displays the adjusted display interface through the interface presentation module 12 on the display module 14.

In this technical framework, the user physiognomy identification module 13 captures and analyzes user characteristics from the client device 20, generating user feature category parameters. These parameters are used by the processing module 15 to retrieve the corresponding interface display configuration files 1112 from the memory module 16. Then, the system presents these adjusted display interfaces on the client device through the interface presentation module 12. Additionally, the display module 14 on the output device 30 receives and displays the adjusted media information, including a display unit 141 and a computing unit 142, the latter of which can recognize and selectively modify the media information to enhance the user experience. This highly integrated system design enables the user interface to be intelligently adjusted according to the specific needs and characteristics of each user.

In specific implementations of this technical framework, the configuration of the server 10, the output device 30, and the client device 20 is flexible. These components can adopt a local host architecture, where all parts are located in the same place, or a cloud server and local host combination, where components are interconnected through the network. Regardless of the chosen architecture, these differences do not affect the core features and application of this technology. In other words, whether local or cloud-based infrastructure, the operation and performance of this technical solution are within its design scope, ensuring the system's adaptability and broad application.

Additionally, the interface adjustment module 11 further includes an automatic rotation control unit 110 and a display content arrangement unit 119. The automatic rotation control unit 110 is responsible for adjusting the display orientation of the output device 30 based on user height information obtained from the user physiognomy identification module 13. Furthermore, the display content arrangement unit 119 adjusts the display interface content of the output device 30 based on the same user height information. For users shorter than the screen's center height, the display content arrangement unit 119 increases the information density in the lower display blocks, while reducing and enlarging the information density and icons in the upper display blocks. Conversely, for taller users, it increases the information density in the upper display blocks, while reducing and enlarging the lower display blocks' information density and icons.

The core of this technology is to intelligently adjust the scaling ratio of the upper and lower areas of the interface based on the user's height relative to the center of the screen. For this purpose, it is first necessary to calculate the vertical distance between the user's eyes and the center of the screen, which can be obtained by subtracting the height of the screen center (hcenter) from the user's eye height (H). This vertical distance ($V_d$) is a key factor in subsequent calculations for the scaling ratio.

Next, based on the calculated vertical distance ($V_d$), the system adjusts the scaling ratio of the interface. When $V_d$ is positive, meaning the user's eyes are above the center of the screen, the scaling ratio of the upper area ($S_{up}$) increases, while that of the lower area ($S_{down}$) decreases. Conversely, when $V_d$ is negative, indicating the user's eyes are below the center, the scaling ratio of the lower area increases, and the upper area decreases. This adjustment of the scaling ratio is calculated using a linear function or a more complex function, including a proportionality factor (k), to ensure appropriateness of the adjustment.

The practical application of this technology is extremely broad, particularly suitable for public display systems that need to accommodate users of different heights, such as information kiosks, automatic ticket machines, or public advertising screens. By measuring the user's height and distance from the screen using sensors, the system can calculate and adjust the interface's scaling ratio in real time, thus ensuring that users of different heights get the best viewing experience. This intelligent adjustment not only improves the accessibility of the display system but also significantly enhances the comfort and efficiency of user interaction.

On the other hand, the core of this technology is to intelligently adjust the orientation and content of the display device's interface based on user height information to provide the best viewing experience. Specifically, when a user approaches the display device, the system measures the user's height and distance from the screen using sensors (such as infrared sensors or cameras). These measurements are used to calculate the optimal angle of the intersection of the user's line of sight with the screen vertically. For instance, if the user's eye height is H, the height of the screen bottom from the ground is h, and the horizontal distance from the user to the screen is D, the angle of sight (θ) can be calculated using trigonometric formulas. This angle determines the degree of screen tilt needed for the user to face the center of the screen directly.

Additionally, the system dynamically adjusts the interface content based on the user's height and the calculated angle of sight. This may include increasing information density or adjusting icon sizes to ensure clear presentation and easy reception of information. This type of personalization based on user stature not only enhances the user experience but also demonstrates the system's advanced capabilities in human-computer interaction. The practical application of this technology is very broad, particularly suitable for public places that need to consider the needs of multiple users, such as shopping malls or airports, as well as personal electronic devices like smart TVs and personal computers.

Additionally, the user characteristics capture module 22 further includes a high-precision eye image capture unit 221, which is signal-connected to an eye image analysis unit 132 of the user physiognomy identification module 13. This eye image analysis unit 132 analyzes user vision information based on eye image capture data from the high-precision eye image capture unit 221. When the user displays characteristics of myopia or hyperopia, adjustments are made to the screen display of the output device 30, including display brightness, font size, and icon proportions. Furthermore, the user characteristics capture module 22 also includes an eye-tracking positioning unit 222 to track and detect the user's eye gaze position on the screen. When this unit analyzes the user's gaze position, interface magnification adjustments are made to the area of the output device 30 being viewed by the user, with pop-up explanations of related icon options in that area.

The uniqueness of this technology lies in its combination of high-precision eye image capture and in-depth vision analysis, followed by personalized interface adjustments. Initially, the user characteristics capture module 22, embedded with a high-precision eye image capture unit 221, is specifically designed for accurately capturing user eye images. These images are then transmitted to the eye image analysis unit 132, which utilizes advanced image processing techniques and artificial intelligence algorithms to analyze the state of the user's eyes, such as pupil size, shape, and eye focus. Through this analysis, the system can accurately determine whether the user has vision problems such as myopia, hyperopia, or astigmatism.

Subsequently, based on the vision information obtained, the system automatically adjusts the display interface of the output device to meet the user's specific vision needs. For instance, for myopic users, the system might enlarge fonts and reduce display brightness to lessen eye strain. Additionally, the technology includes an eye-tracking positioning unit 222, which tracks and detects the user's eye gaze position on the screen and dynamically adjusts the screen area being viewed by the user, such as magnifying that area or displaying detailed information about relevant icons and options. This comprehensive and meticulous approach not only enhances the user's visual experience but also makes the system interaction more intuitive and personalized.

Furthermore, the user physiognomy identification module 13 further includes a user age analysis unit 133 for analyzing user age information through image analysis. When the user age analysis unit 133 analyzes the user's age, the interface adjustment module 11 makes parameter adjustments to the display interface of the output device 30 as follows: for users detected to be over 65 years old, the number of icons and options displayed is reduced and enlarged for better visibility.

A highlight of this technology is its ability to identify user age information through image analysis and make interface adjustments based on this information, especially for the user experience of older adults. Initially, the user physiognomy identification module 13 houses a user age analysis unit 133, which uses advanced image processing technology to analyze the user's facial features, such as the depth of wrinkles, skin texture, and other age-related biomarkers. Through these features, the system can estimate the user's approximate age range.

Once the user's age is analyzed, the system further adjusts the interface to meet the needs of specific age groups. This includes special interface adjustments for older users aged over 65. For instance, to make it easier for these users to read and operate, the system automatically reduces the number of icons and options on the screen and enlarges these elements for easier recognition and use. This design considers changes that may occur with age, such as decreased vision and reduced hand dexterity.

Additionally, this age-based interface adjustment not only enhances the user experience for older adults but also reflects the system's inclusivity and human-centered design. By considering user age as an important parameter in interface design, the system provides a more personalized and comfortable environment for users of different ages. This intelligent adjustment makes the product easier to use and demonstrates a deep understanding and care for the older user demographic.

From the above description, it is clear that this technology achieves the following advantages: Personalized Display Interface Adjustments: A major strength of this system is its highly personalized display interface adjustment capability. Through the automatic rotation control unit 110 and the display content arrangement unit 119, the system can adjust the orientation and content of the display interface of the output device 30 based on user height information. This means that for users of different heights, the system intelligently adjusts the presentation of information, such as increasing information density or adjusting icon sizes, to ensure that all users receive information in the most suitable way. This personalization based on user stature not only enhances user experience but also demonstrates the system's advanced capabilities in human-computer interaction.

Vision and Age-Sensitive Interface Adjustments: Another significant functional advantage is the system's sensitivity to user vision and age. Through the high-precision eye image capture unit 221 and the eye image analysis unit 132, the system can identify vision characteristics of the user (such as myopia or hyperopia) and accordingly adjust the screen's brightness, font size, and icon proportions. Moreover, utilizing the user age analysis unit 133, the system can make appropriate adjustments to the display interface based on user age, especially for older users, by reducing and enlarging display elements to make them more recognizable and easier to use. These features emphasize the system's innovation and practicality in providing a highly customized user experience catering to different vision and age requirements.

In more detail, the system further includes a user usage state feedback module 18, installed on the server 10, for receiving and processing user feedback information from the output device 30. This user usage state feedback module 18 includes a user interaction interface that allows users to directly provide feedback on interface adjustments and system operations and sends this feedback back to the server 10. Additionally, the user usage state feedback module 18 further includes a data collection unit 181 for collecting behavioral data during user system operation, including operation frequency, preference settings, and operational issues, and sends the collected data back to the server 10 to optimize the functionality and performance of the interface adjustment module 11 and other related modules.

Following the above, each interface adjustment unit 111 also includes at least one script or program for handling user interaction, to dynamically adjust the interface based on specific user needs. Furthermore, the user physiognomy identification module 13 further includes a biometric identification unit 131, which identifies user physiognomy based on biometric characteristics such as fingerprints, facial recognition, or voice patterns. The processing module 15 includes a central processing unit 151 (CPU) and at least one graphics processing unit 152 (GPU) to enhance the processing speed and efficiency of the interface adjustment module 11 and the interface presentation module 12. Additionally, the memory module 16 further includes a random access memory 161 for storing frequently accessed interface display configuration files 1112 to speed up data retrieval and processing.

Moreover, the user usage state recording module 17 further includes a data analysis unit 171 for analyzing user operation patterns and habits to optimize interface adjustment strategies. The interface presentation module 12 further includes a dynamic link library 121 (DLL) to support various types of media formats and interaction protocols to ensure compatibility with multiple types of output devices.

From the detailed architecture of this technology, it is evident that first and foremost, the user usage state feedback module 18 in our invention enhances the system's interactivity and adaptability. Installed on the server 10, this module can receive and process user feedback information from the output device 30. This not only allows users to directly influence system behavior by providing feedback on interface adjustments and system operations, but the module also includes a data collection unit 181 for gathering user operational data, such as operation frequency and preference settings, enabling the system to optimize the functionality and performance of the interface adjustment module 11 and other related modules based on this data. This continuous optimization based on user feedback not only improves user experience but also makes the system more attuned to actual user needs.

Furthermore, the design of each interface adjustment unit 111 in the system also demonstrates the technical advantages of our invention. These units contain scripts or programs for handling user interactions, allowing the system to dynamically adjust the interface based on specific user needs. Coupled with the biometric identification unit 131 in the user physiognomy identification module 13, which includes fingerprint and facial recognition, the system can more accurately identify and respond to the specific needs of different users. Additionally, the central processing unit 151 and the graphics processing unit 152 in the processing module 15, along with the fast access memory 161 in the memory module 16, further enhance the speed and efficiency of interface adjustments and presentations. The combination of these components not only boosts the system's processing capability but also ensures compatibility with various output devices, showcasing the system's technological advancement and flexibility.

Moreover, this technology offers the following technical details: the display unit 141 of the display module 14 further includes a high-definition screen for more clearly presenting adjusted media information, and the computing unit 142 includes an artificial intelligence chip for real-time analysis and prediction of user potential operation intentions to dynamically adjust the interface.

On the other hand, the client device 20 further includes a multi-touch screen to support more complex and intuitive user interactions, as well as a voice input module, allowing users to interact with the system via voice commands.

The functional narrative advantage of our invention lies in its integration of advanced display technology and artificial intelligence applications to provide a more efficient and intuitive user experience. The display module 14 is equipped with a high-definition screen, ensuring clear presentation of media information, and through the artificial intelligence chip embedded in the computing unit 142, it can real-time analyze and predict the user's operation intentions, thereby dynamically adjusting the interface to meet user needs. Furthermore, the multi-touch screen of the client device 20 supports complex and intuitive user interactions, while the voice input module allows users to interact with the system via voice commands. The integration of these functionalities not only enhances the convenience of user operations but also improves the overall fluidity and efficiency of interactions.

In addition, this invention provides a method for automatically adjusting a user interface based on user identity recognition, which includes the following steps: First, execute step (S1), operating an interface adjustment module 11 on the server 10, which has multiple interface adjustment units 111, each corresponding to an interface display block 1111; then, in step (S2), use the processing module 15 to extract interface display configuration files 1112 stored in the memory module 16; identifying user physiognomy through the user physiognomy identification module 13, based on user characteristics obtained from the user characteristics capture module 22 of the client device 20.

Following this, execute step (S3), replacing the display content of the interface display block 1111 through the processing module 15 based on the identified user physiognomy, to adjust the display content of the client device; and step (S4), recording and analyzing the user's usage state and operation information on the output device through the user usage state recording module 17; and step (S5), controlling the display interface content of the output device through the interface presentation module 12.

Within these operational steps of the invention, further details include: after step (S1), a step (S1-1), which involves analyzing the current operating environment or application status of the client device 20 through the interface adjustment module 11, to select the most suitable configuration for the interface display block 1111. Also, after step (S3), a step (S3-1), which involves presenting a temporary user feedback interface after interface adjustment, allowing users to evaluate and provide feedback on the new interface display block 1111.

Additionally, after step (S4), a step (S4-1), involves dynamically adjusting the subsequent user interaction process based on the user's operation information and usage state, to optimize the user experience. Furthermore, after step (S5), a step (S5-1), which involves automatically generating a user usage report based on the results of controlling the display interface content of the output device and storing this report in the memory module 16 for future reference.

The following summarizes the core functionalities and advantages of this invention:
- A. Personalized Interface Adjustment: The system possesses a highly personalized interface adjustment capability, intelligently adjusting the display orientation and content of the output device based on user height information, presenting information in the most suitable manner to users, thereby enhancing the user experience.
- B. Vision and Age-Sensitive Adjustment: The system is sensitive to the user's vision and age, adjusting screen brightness, font size, and icon proportions based on user vision characteristics. For older users, it performs special display adjustments, providing a highly customized user experience.
- C. User Interaction and Feedback: The user usage state feedback module allows users to directly provide feedback on interface adjustments and system operations, and collects operational data (such as frequency of use and preference settings), enabling the system to continually optimize based on these data, more closely aligning with actual user needs.
- D. Dynamic Interface Adjustment: Each interface adjustment unit contains scripts or programs for handling user interactions, enabling the system to dynamically adjust according to specific user needs, increasing system flexibility and the potential for user customization.
- E. Efficient Processing Capability: The processing module, equipped with a central processing unit and graphics processing unit, along with fast access memory, greatly enhances the speed and efficiency of interface adjustment and presentation while ensuring compatibility with various output devices.
- F. Application of Biometric Identification Technology: The user physiognomy identification module includes biometric identification units, such as fingerprint and facial recognition, allowing the system to more precisely identify and respond to specific needs of different users, enhancing system security and personalization.

It must be emphasized that the detailed descriptions above are specific illustrations of feasible embodiments of this invention and are not intended to limit the scope of this invention. Any equivalent implementations or modifications that do not depart from the spirit and scope of this invention should be included within the patent scope of this case.

What is claimed is:

1. A system for automatically adjusting a user interface based on user identity, installed on a server and an output device, wherein the server is communicatively connected to the output device and a client device, and the system comprises:
    an interface adjustment module, installed on the server and having multiple interface adjustment units, where each interface adjustment unit corresponds to an interface display block and can replace a display content of the interface display block based on multiple sets of interface display configuration files, and the interface display block corresponds to a portion of the display content of the client device of the output device;
    a processing module, installed on the server and electrically connected to the interface adjustment module;
    a memory module, installed on the server and electrically connected to the processing module, where the interface display configuration files are stored in the memory module and can be retrieved by the interface adjustment module through the processing module;
    a user physiognomy identification module, installed on the server and communicatively connected to a user characteristics capture module of the client device, where the user characteristics capture module transmits captured user characteristics to the user physiognomy identification module;
    a user usage state recording module, installed on the server and communicatively connected to the output device, where the user usage state recording module records the user's usage state and operation information via the output device;
    an interface presentation module, installed on the server and connected to the processing module, and the interface adjustment module retrieves the interface display configuration files from the memory module through the processing module to change a presentation parameter of the interface presentation module, where the interface presentation module is communicatively connected to the output device and controls a display interface content of the output device and the client device through the presentation parameter; and
    at least one display module, installed on the client device of the output device and signal-connected to the interface presentation module, where the at least one display module includes a display unit and a computing unit, and the display unit receives and displays media information generated by the interface adjustment module and the interface presentation module on the output device, and the computing unit recognizes and selectively makes triggerable changes to the media information;
    wherein, the user physiognomy identification module captures user information characteristics to produce a user feature category parameter and provides it to the processing module, and the interface adjustment module generates a user corresponding interface adjustment parameter based on the user feature category parameter, and the processing module retrieves a corresponding interface display configuration file from the memory module based on the user corresponding interface adjustment parameter and displays an adjusted display interface through the interface presentation module on the at least one display module.

2. The system according to claim 1, further comprising a user usage state feedback module, installed on the server, for receiving and processing user feedback information from the output device, the user usage state feedback module includes a user interaction interface that allows users to directly provide feedback on interface adjustments and system operations, and sends this feedback information back to the server.

3. The system according to claim 2, wherein the user usage state feedback module further includes a data collection unit for collecting behavioral data of the user while operating the system, including operation frequency, preference settings, and operational issues, and sends the collected data back to the server to optimize a functionality and performance of the interface adjustment module and other related modules.

4. The system according to claim 1, wherein each interface adjustment unit also includes at least one script or program for handling user interactions, to dynamically adjust the interface based on specific user needs, furthermore, the user physiognomy identification module includes a biometric identification unit, which identifies user physiognomy based on biometric characteristics including fingerprints, facial recognition, or voice patterns.

5. The system according to claim 1, wherein the processing module includes a central processing unit (CPU) and at least one graphics processing unit (GPU) to enhance the processing speed and efficiency of the interface adjustment module and the interface presentation module, furthermore, the memory module includes a fast access memory for storing frequently accessed interface display configuration files to accelerate data retrieval and processing.

6. The system according to claim 1, wherein the user usage state recording module further includes a data analysis unit for analyzing user operation patterns and habits to optimize interface adjustment strategies, furthermore, the interface presentation module includes a dynamic link library (DLL) for supporting various types of media formats and interaction protocols, ensuring compatibility with multiple types of output devices.

7. The system according to claim 1, wherein the interface adjustment module further includes an automatic rotation control unit and a display content arrangement unit, with the automatic rotation control unit responsible for adjusting the display orientation of the output device based on user height information obtained from the user physiognomy identification module; furthermore, the display content arrangement unit adjusts the display interface content of the output device based on the user height information from the user physiognomy identification module, increasing information density in lower display blocks for users shorter than a screen's center height while reducing and enlarging the information density and icons in upper display blocks, and vice versa for taller users.

8. The system according to claim 1, wherein the user characteristics capture module further includes a high-precision eye image capture unit signal-connected to an eye image analysis unit of the user physiognomy identification module, and the eye image analysis unit analyzes user vision information based on eye image capture information from the high-precision eye image capture unit; when identifying myopia and hyperopia characteristics in users, adjustments are made to the screen display of the output device including display brightness, font size, and icon proportions.

9. The system according to claim 1, wherein the user characteristics capture module further includes an eye tracking positioning unit to track and detect user eye gaze positions on the screen, and when the eye tracking positioning unit analyzes user gaze position, interface magnification adjustments are made to the area of the output device where the user is looking, with pop-up explanations for relevant icon options in that area.

10. The system according to claim 1, wherein the user physiognomy identification module further includes a user age analysis unit for analyzing user age through image analysis, and when the user age analysis unit determines the user's age, the interface adjustment module makes the following parameter adjustments to the display interface of the output device: for users detected to be over 65 years old, the number of icons and options displayed is reduced and enlarged for better visibility.

\* \* \* \* \*